US012777562B2

(12) United States Patent
Kwack et al.

(10) Patent No.: US 12,777,562 B2
(45) Date of Patent: Oct. 27, 2026

(54) COOKING APPLIANCE

(71) Applicant: LG ELECTRONICS INC., Seoul (KR)

(72) Inventors: Younghwan Kwack, Seoul (KR); Seongho Son, Seoul (KR)

(73) Assignee: LG ELECTRONICS INC., Seoul (KR)

(*) Notice: Subject to any disclaimer, the term of this patent is extended or adjusted under 35 U.S.C. 154(b) by 775 days.

(21) Appl. No.: 18/142,356

(22) Filed: May 2, 2023

(65) Prior Publication Data

US 2023/0354483 A1 Nov. 2, 2023

(30) Foreign Application Priority Data

May 2, 2022 (KR) ........................ 10-2022-0054377

(51) Int. Cl.

| | |
|---|---|
| ***H05B 6/06*** | (2006.01) |
| ***H02H 3/08*** | (2006.01) |
| ***H02M 7/537*** | (2006.01) |
| ***H05B 6/12*** | (2006.01) |

(52) U.S. Cl.

CPC ............... *H05B 6/062* (2013.01); *H02H 3/08* (2013.01); *H02M 7/537* (2013.01); *H05B 6/1254* (2013.01); *H05B 6/1263* (2013.01); *H05B 2213/05* (2013.01)

(58) Field of Classification Search

CPC .... H05B 6/062; H05B 6/1254; H05B 6/1263; H05B 2213/05; H05B 6/12; H05B 6/1209; H02H 3/08; H02M 7/537

See application file for complete search history.

(56) References Cited

U.S. PATENT DOCUMENTS

| | | | | |
|---|---|---|---|---|
| 7,057,144 | B2 * | 6/2006 | Hirota | H05B 6/1254 219/624 |
| 10,917,947 | B2 * | 2/2021 | Son | H05B 6/062 |
| 2020/0072472 | A1 * | 3/2020 | Kim | H05B 6/1263 |
| 2020/0288542 | A1 * | 9/2020 | Jun | H05B 6/1209 |
| 2021/0195702 | A1 | 6/2021 | Kim et al. | |
| 2021/0315067 | A1 | 10/2021 | Kwack et al. | |
| 2023/0134447 | A1 | 5/2023 | Kwack et al. | |

FOREIGN PATENT DOCUMENTS

WO WO 2021/194173 A1 9/2021

* cited by examiner

*Primary Examiner* — Michael L Sehn

(74) *Attorney, Agent, or Firm* — Birch, Stewart, Kolasch & Birch, LLP

(57) ABSTRACT

A cooking appliance includes an upper plate configured to support an object to be heated, a working coil configured to generate a magnetic field to heat the object to be heated, an inverter configured apply current to the working coil, an intermediate heating body located at the upper plate, the intermediate heating body configured to generate an eddy current when the magnetic field passes therethrough, and a switch configured to connect a first point and a second point on the intermediate heating body.

20 Claims, 11 Drawing Sheets

COOKING APPLIANCE

CROSS-REFERENCE TO RELATED APPLICATION

This non-provisional application claims the benefit under 35 U.S.C. § 119(a) to Patent Application No. 10-2022-0054377, filed in the Republic of Korea on May 2, 2022, all of which is hereby expressly incorporated by reference into the present application.

FIELD

The present disclosure relates to a cooking appliance. More particularly, the present disclosure relates to a cooking appliance, which is capable of heating all of a magnetic body and a nonmagnetic body.

BACKGROUND

Various types of cooking appliances are used to heat food at home or in the restaurant. According to the related art, a gas stove using gas as a fuel has been widely used. However, recently, devices for heating an object to be heated, for example, a cooking vessel such as a pot, have been spread using electricity instead of the gas.

A method for heating the object to be heated using electricity is largely divided into a resistance heating method and an induction heating method. The electrical resistance method is a method for heating an object to be heated by transferring heat generated when electric current flows through a metal resistance wire or a non-metal heating body such as silicon carbide to the object to be heated (e.g., a cooking vessel) through radiation or conduction. In the induction heating method, when high-frequency power having a predetermined intensity is applied to a coil, eddy current is generated in the object to be heated using magnetic fields generated around the coil so that the object to be heated is heated.

Recently, most of the induction heating methods are applied to cooktops.

Meanwhile, such a cooking appliance has a limitation in that the heating efficiency of the non-magnetic container is very low compared to the heating efficiency of the magnetic container. Therefore, in order to solve the problem of very low heating efficiency for non-magnetic materials (for example, heat-resistant glass, pottery, or the like), the cooktop includes an intermediate heating body to which eddy current is applied, and the non-magnetic material can be heated through the intermediate heating body.

However, when the intermediate heating body is installed on the upper portion, when heating the magnetic container, there is a problem in that some magnetic fields combine with the intermediate heating body to indirectly heat the intermediate heating body before reaching the magnetic container.

SUMMARY

An object of the present disclosure is to provide a cooking appliance capable of heating all of magnetic, non-magnetic, and non-metallic containers regardless of the container material.

An object of the present disclosure is to minimize a problem of deterioration in heating efficiency of a magnetic container in a cooking appliance including an intermediate heating body.

In the cooking appliance according to an embodiment of the present disclosure, a separate switching structure may be applied to the intermediate heating body to control the coupling force of the magnetic field generated from the intermediate heating body and the working coil.

In the cooking appliance according to an embodiment of the present disclosure, a separate switching structure is applied to an intermediate heating body to suppress heating of the intermediate heating body when heating a magnetic container, and to heat the intermediate heating body when heating a non-magnetic or non-metallic container.

A cooking appliance according to an embodiment of the present disclosure may include an upper plate, on which an object to be heated is disposed; a working coil configured to generate a magnetic fields for heating the object to be heated; an inverter configured to drive so that current is supplied to the working coil; an intermediate heating body disposed on the upper plate and flowing with eddy current when the magnetic field passes therethrough; and a switch configured to connect one point and another point on the intermediate heating body.

A disconnection portion including a portion is cut may be formed in the intermediate heating body, and the switch may selectively connect the disconnection portion.

The intermediate heating body may include a disconnection portion comprising a portion of which is cut and a single heating member having a closed loop shape, and wherein the switch may include a single switch connecting the disconnection portion.

The intermediate heating body may include a disconnection portion where at least one of which is cut and a plurality of heating members having a closed loop shape, and the switch may include a single switch for simultaneously connecting or disconnecting a plurality of disconnection portions formed on each of the plurality of heating members.

The intermediate heating body may include a disconnection portion where at least one of which is cut and a plurality of heating members having a closed loop shape, and the switch may include a plurality of switches connected to each of the plurality of disconnection portions formed in each of the plurality of heating members.

A size of each of the plurality of heating members may be different from each other.

The plurality of heating members may include a first heating member and a second heating member, and a radius of the first heating member may be shorter than a radius of the second heating member.

It may be determined whether the plurality of switches is turned off together based on the type of the object to be heated, and a switch to be turned on among the plurality of switches may be determined based on the size of the object to be heated.

The plurality of switches may include a first switch connecting a first disconnection portion formed in the first heating member, and a second switch connecting the second disconnection portion formed in the second heating member, and the first switch and the second switch may be turned off together based on the type of the object to be heated and may be turned on according to the size of the object to be heated, respectively.

When the object to be heated is magnetic material, the first switch and the second switch may be turned off together, when the object to be heated is a non-magnetic material having a predetermined size or larger, the first switch and the second switch may be turned on together; and when the object to be heated is a non-magnetic material smaller than a predetermined size, the first switch may be turned on.

The switch may be turned on or off based on the type or size of the object to be heated.

The area of the closed loop formed by the eddy current may be changed according to the on or off of the switch.

When the switch is turned on, a closed loop having an area of a first size may be formed in the intermediate heating body, and when the switch is turned off, a closed loop having a second size smaller than the first size may be formed in the intermediate heating body.

The switch may be turned on when the object to be heated is a non-magnetic material and turned off when the object to be heated is a magnetic material.

Technical Effects

According to an embodiment of the present disclosure, there is an advantage in that heating is possible regardless of the container material and the heating efficiency for each container material is maximized, by adjusting the magnetic field coupling force of the intermediate heating body, that is, the heating value generated in the intermediate heating body, according to the type of object to be heated through a switch connected to the intermediate heating body.

According to an embodiment of the present disclosure, there is an advantage in that a heating region can be adjusted by configuring the intermediate heating body as a plurality of heating members and connecting individual switches to each heating member.

DETAILED DESCRIPTION

Figure 1:
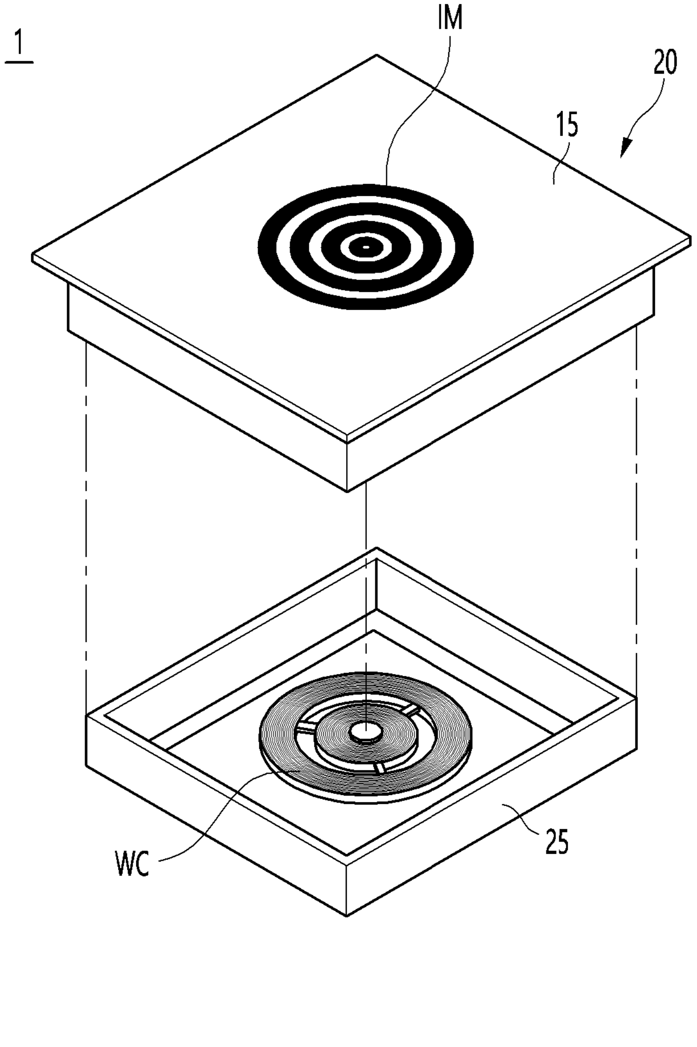
FIG. 1 is a perspective view illustrating a cooking appliance according to an embodiment of the present disclosure.

Hereinafter, preferred embodiments according to the present disclosure will be described in detail with reference to the accompanying drawings. In the drawings, the same reference numerals are used to indicate the same or similar components.

The suffixes "module" and "portion" for components used in the following description are given or used together in consideration of ease of writing the specification, and do not have meanings or roles that are distinct from each other by themselves.

In the following description, "connection" between components includes not only direct connection of components, but also indirect connection through at least one other component, unless otherwise specified.

Hereinafter, a cooking appliance and an operating method thereof according to an embodiment of the present disclosure will be described. Hereinafter, the cooking appliance may be an induction heating type cooktop.

Hereinafter, a cooking appliance according to an embodiment of the present disclosure will be described.

Figure 2:
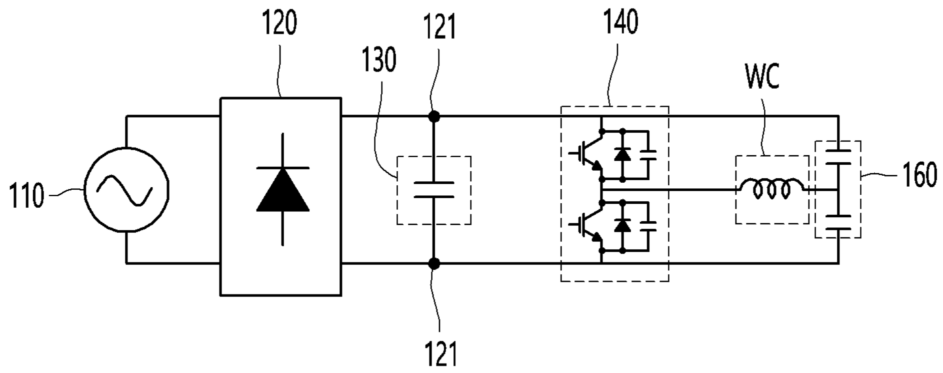
FIG. 2 is a circuit diagram of a cooking appliance according to an embodiment of the present disclosure.
Figure 3:
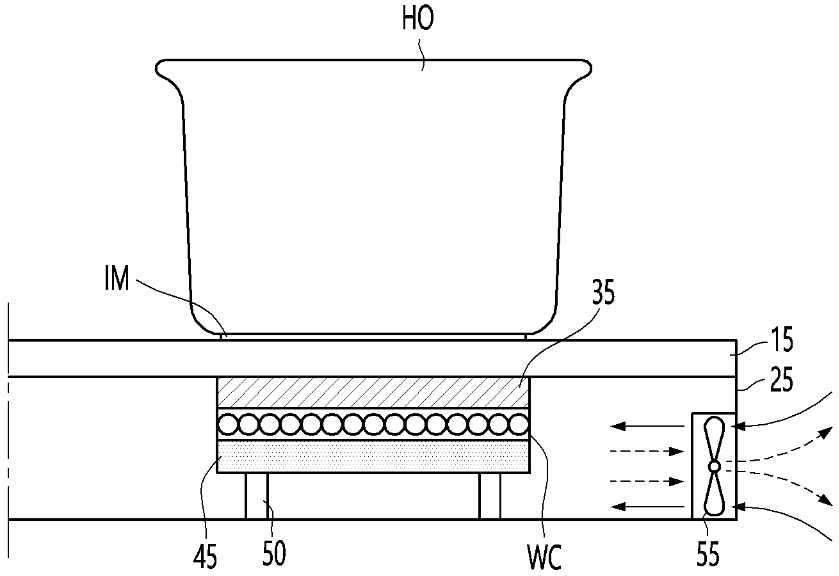
FIG. 3 is a cross-sectional view illustrating a cooking appliance and an object to be heated according to an embodiment of the present disclosure.
Figure 4:
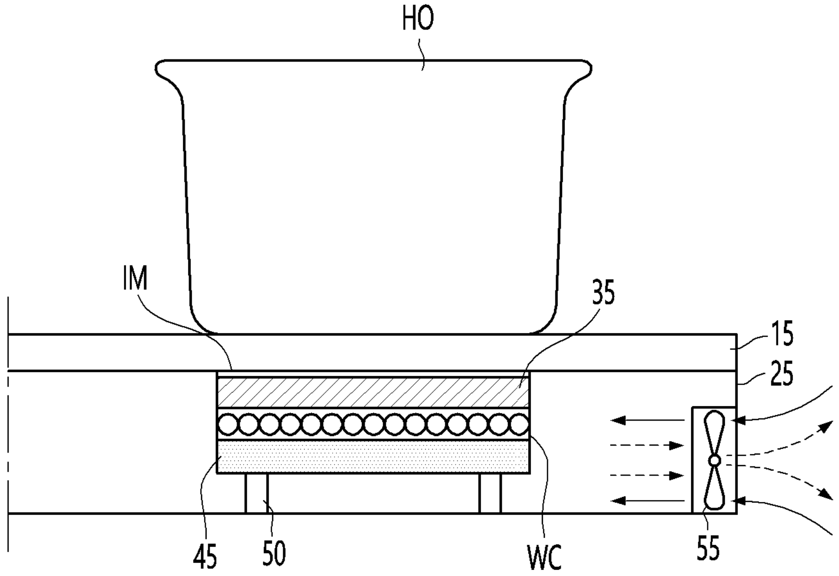
FIG. 4 is a cross-sectional view illustrating a cooking appliance and an object to be heated according to another embodiment of the present disclosure.

FIG. 1 is a perspective view illustrating a cooking appliance according to an embodiment of the present disclosure, FIG. 2 is a circuit diagram of a cooking appliance according to an embodiment of the present disclosure, FIG. 3 is a cross-sectional view illustrating a cooking appliance and an object to be heated according to an embodiment of the present disclosure, and FIG. 4 is a cross-sectional view illustrating a cooking appliance and an object to be heated according to another embodiment of the present disclosure.

First, referring to FIG. 1, a cooking appliance 1 according to an embodiment of the present disclosure includes a case 25, a cover plate 20, a working coil (WC), and an intermediate heating body (IM).

The WC may be installed in the case 25.

For reference, in the case 25, various devices related to driving of the working coil (for example, a power supply that provides alternating current (AC) power, a rectifier that rectifies the AC power of the power supply into direct current (DC) power, an inverter that converts the DC power rectified by the rectifier into resonance current through a switching operation to provides the resonance current to the WC, a control module that controls operations of various devices within the cooking appliance 1, a relay or semiconductor switch that turns on or off the WC, etc.) in addition the working coils (e.g., WC1 and WC2) may be installed in the case 25.

The cover plate 20 may be coupled to an upper end of the case 25 and be provided with an upper plate 15 on which an object to be heated (HO) (not shown) is disposed on a top surface thereof.

Specifically, the cover plate 20 may include the upper plate 15 for disposing an HO, such as a cooking vessel. Thereon. That is, an HO may be disposed on the upper plate 15.

Here, the upper plate 15 may be made of, for example, a glass material (e.g., ceramics glass).

In addition, the upper plate 15 may be provided with an input interface (not shown) that receives an input from a user to transmit the input to a control module (not shown) for an input interface. Of course, the input interface may be provided at a position other than the upper plate 15.

For reference, the input interface may be a module for inputting a desired heating intensity or driving time of the cooking appliance 1 and may be variously implemented with a physical button or a touch panel. Also, the input interface may include, for example, a power button, a lock button, a power level adjustment button (+, −), a timer adjustment button (+, −), a charging mode button, and the like. In addition, the input interface may transmit the input received from the user to the control module for the input interface (not shown), and the control module for the input interface may transmit the input to the aforementioned control module (i.e., the control module for the inverter). In addition, the aforementioned control module may control the operations of various devices (e.g., the WCs) based on the input (i.e., a user input) provided from the control module for the input interface.

Whether the WC is driven and the heating intensity (i.e., thermal power) may be visually displayed on the upper plate 15, and may be indicated by an indicator (not shown) constituted by a plurality of light emitting devices (e.g., LEDs) provided in the case 25.

The WC may be installed inside the case 25 to heat the HO.

Specifically, the WC may be driven by the aforementioned control module (not shown), and when the HO is disposed on the upper plate 15, the WC may be driven by the control module.

In addition, the WC may directly heat an HO (i.e., a magnetic body) having magnetism and may indirectly heat an object to be used (i.e., a non-magnetic body) through an IM that will be described later.

In addition, the WC may heat the HO in an induction heating manner and may be provided to overlap the IM in a longitudinal direction (i.e., a vertical direction or an upward and downward direction).

For reference, although the structure in which one WC is installed in the case 25 is illustrated in FIG. 1, the embodiment is not limited thereto. That is, one or more WCs may be installed in the case 25. The IM may be installed to correspond to the WC. The number of IMs and the number of WCs may be the same.

The IM may be installed on the upper plate 15. The IM may be applied on the upper plate 15 to heat the non-magnetic body among the Hos. The IM may be inductively heated by the WC.

The IM may be disposed on a top surface or a bottom surface of the upper plate 15. For example, as illustrated in FIG. 2, the IM may be installed on the top surface of the upper plate 15, or as illustrated in FIG. 3, the IM may be installed on the bottom surface of the upper plate 15.

The IM may be provided to overlap the WC in the longitudinal direction (i.e., the vertical direction or the upward and downward direction). Thus, the heating of the HO may be possible regardless of the arrangement positions and types of the Hos.

Also, the IM may have at least one of magnetic and non-magnetic properties (i.e., a magnetic property, a non-magnetic property, or both the magnetic and non-magnetic properties).

In addition, the IM may be made of, for example, a conductive material (e.g., aluminum), and as illustrated in the drawings, a plurality of rings having different diameters may be installed on the upper plate 15 in a repeated shape, but is not limited thereto. That is, the IM may be made of a material other than a conductive material. Also, the IM may be provided in a shape other than the shape in which the plurality of rings having different diameters are repeated.

For reference, although one IM is illustrated in FIGS. 3 and 4, the embodiment is not limited thereto. That is, a plurality of thin films may be installed, but for convenience of description, one IM may be installed as an example.

FIG. 2 is a circuit diagram of a cooking appliance according to an embodiment of the present disclosure.

Referring to FIG. 2, the cooking appliance may include at least some or all of a power supply 110, a rectifier 120, a direct current (DC) link capacitor 130, an inverter 140, a WC, and a resonance capacitor 160.

The power supply 110 may receive external power. The power that the power supply 110 receives from the outside may be Alternative Current (AC) power.

The power supply 110 may supply AC voltage to the rectifier 120.

The rectifier 120 is an electrical device for converting AC into DC. The rectifier 120 converts the AC voltage supplied through the power supply 110 into a DC voltage. The rectifier 120 may supply the converted voltage to DC both terminals 121.

An output terminal of the rectifier 120 may be connected to both DC terminals 121. Both DC terminals 121 output through the rectifier 120 may be referred to as a DC link. The voltage measured across both DC terminals 121 is referred to as the DC link voltage.

The DC link capacitor 130 serves as a buffer between the power supply 110 and the inverter 140. Specifically, the DC link capacitor 130 is used to maintain the DC link voltage converted through the rectifier 120 and supply the DC link voltage to the inverter 140.

The inverter 140 serves to switch a voltage applied to the WC so that a high-frequency current flows through the WC. The inverter 140 may apply current to the WC. The inverter 140 may include a relay, a semiconductor switch, or the like that turns on or off the WC. For example, the inverter 140 may include a semiconductor switch, and the semiconductor switch may be an Insulated Gate Bipolar Transistor (IGBT) or a Wide Band Gab (WBG) element, but this is only exemplary and is not limited thereto. Meanwhile, the WBG element may be SiC (Silicon Carbide), GaN (Gallium Nitride), or the like. The inverter 140 causes a high-frequency current to flow through the WC by driving the semi-conductor switch, and thus a high-frequency magnetic field is formed in the WC.

The WC may include at least one WC generating a magnetic field for heating the HO. Current may or may not flow through the WC depending on whether the switching element is driven. When a current flows through the WC, a magnetic field is generated. The WC may heat the cooking appliance by generating a magnetic field as current flows.

One side of the WC is connected to the connection point of the switching element of the inverter 140, and the other side thereof is connected to the resonant capacitor 160.

The driving of the switching element is performed by a driver (not illustrated), and is controlled at a switching time output from the driver to apply a high-frequency voltage to the WC while the switching elements alternately operate with each other. In addition, since the on/off time of the switching element applied from the driver (not illustrated) is controlled in a gradually compensated manner, the voltage supplied to the WC changes from a low voltage to a high voltage.

The resonance capacitor 160 may resonate with the WC.

The resonance capacitor 160 may be a component for serving as a shock absorber. The resonance capacitor 160 affects the energy loss during the turn-off time by adjusting the saturation voltage rise rate during the turn-off of the switching element.

Next, referring to FIGS. 3 and 4, the cooking appliance 1 according to an embodiment of the present disclosure may further include at least some or all of an insulating material 35, a shielding plate 45, a support member 50, and a cooling fan 55.

The insulating material 35 may be provided between the upper plate 15 and the WC.

Specifically, the insulating material 35 may be mounted under the upper plate 15, and the WC may be disposed below the insulating material 35.

The insulating material 35 may prevent heat generated while the IM or the HO to be heated by the driving of the WC from being transmitted to the WC.

That is, when the IM or the HO is heated by electromagnetic induction of the WC, the heat of the IM or the HO may be transferred to the upper plate 15, and then, the heat of the upper plate 15 may be transferred to the WC again to damage the WC.

The insulating material 35 may block the heat transferred to the WC as described above to prevent the WC from being damaged by the heat, and furthermore, prevent heating performance of the WC from being deteriorated.

For reference, although it is not an essential component, a spacer (not shown) may be installed between the WC and the insulating material 35.

Specifically, the spacer (not shown) may be inserted between the WC and the insulating material 35 so that the WC and the insulating material 35 are not in directly contact with each other. Thus, the spacer (not shown) may prevent the heat generated while the IM or the HO by the driving of the WC from being transmitted to the WC through the insulating material 35.

That is, since the spacer (not shown) partially shares the role of the insulating material 35, a thickness of the insulating material 35 may be minimized, and thus, an interval between the HO and the WC may be minimized.

In addition, the spacer (not shown) may be provided in plurality, and the plurality of spacers may be disposed to be spaced apart from each other between the WC and the insulating material 35. Thus, air suctioned into the case 25 by a cooling fan 55 to be described later may be guided to the WC by the spacers (not shown).

That is, the spacers may guide the air introduced into the case 25 by the cooling fan 55 so as to be properly transferred to the WC, thereby improving cooling efficiency of the WC.

The shielding plate 45 may be mounted under the WC to block magnetic fields generated downward when the WC is driven.

Specifically, the shielding plate 45 may block the magnetic fields generated downward when the WC is driven and may be supported upward by the support member 50.

The support member 50 may be installed between a bottom surface of the shielding plate 45 and the lower plate of the case 25 to support the shielding plate 45 upward.

Specifically, the support member 50 may support the shielding plate 45 upward to indirectly support the insulating material 35 and the WC upward, and thus, the insulating material 35 may be in close contact with the upper plate 15.

As a result, the interval between the WC and the HO may be constantly maintained.

For reference, the support member 50 may include, for example, an elastic body (e.g., a spring) for supporting the shielding plate 45 upward, but is not limited thereto.

In addition, since the support member 50 is not an essential component, the support member 50 may be omitted from the cooking appliance 1.

The cooling fan 55 may be installed inside the case 25 to cool the WC.

Specifically, the cooling fan 55 may be controlled to be driven by the above-described control module and may be installed on a sidewall of the case 25. Of course, the cooling fan 55 may be installed at a position other than the sidewall of the case 25, but in the present disclosure, for convenience of explanation, the structure in which the cooling fan 55 is installed on the sidewall of the case 25 will be described as an example.

In addition, as illustrated in FIGS. 3 and 4, the cooling fan 55 may suction air from the outside of the case 25 to deliver the air to the WC or may suction air (particularly, heated air) inside the case 25 to discharge the air to the outside of the case 25.

As a result, efficient cooling of the components (in particular, the WC) inside the case 25 is possible.

Also, as described above, the air outside the case 25 delivered to the WC by the cooling fan 55 may be guided to the WC by the spacers. Thus, the direct and efficient cooling of the WC is possible to improve durability of the WC (i.e., improvement in durability due to prevention of thermal damage).

The IM may be a material having a resistance value that is capable of being heated by the WC.

A thickness of the IM may be inversely proportional to the resistance value (i.e., a surface resistance value) of the IM. That is, as the thickness of the IM decreases, the resistance value (i.e., surface resistance value) of the IM increases. Thus, characteristics of the IM may be changed to a load that may be heated.

For reference, the IM according to the embodiment of FIG. 2 through FIG. 3 may have a thickness of, for example, about 0.1 m to about 1,000 m, but is not limited thereto.

The IM having such characteristics may be present to heat the non-magnetic body, and thus, impedance characteristics between the IM and the HO may be changed according to whether the HO disposed on the upper plate 15 is a magnetic body or non-magnetic body.

The case in which the HO is the magnetic body will be described as follows.

When the magnetic HO is disposed on the upper plate 15, and the working coil WC is driven, a resistance component and an inductor component of the HO, which has the magnetism as illustrated in FIG. 4, may form an equivalent circuit with a resistance component and an inductor component of the IM. In this case, the impedance (i.e., impedance measured by the resistance component and the inductor component of the HO) of the HO, which has the magnetism, in the equivalent circuit may be less than that of the IM (i.e., the impedance measured by the resistance component and the inductor component of the IM). Thus, when the equivalent circuit as described above is formed, magnitude of the eddy current applied to the magnetic HO may be greater than that of the eddy current applied to the IM. Thus, most of the eddy current generated by the WC may be applied to the HO to be heated, and thus, the HO may be heated. That is, when the HO is the magnetic body, the above-described equivalent circuit may be formed, and thus, most of the eddy current may be applied to the HO to be heated. As a result, the WC may directly heat the HO.

Next, the case in which the HO is the non-magnetic body will be described as follows.

When the HO, which does not have the magnetism, is disposed on the upper plate 15, and the WC is driven, there is no impedance in the non-magnetic HO, and the IM may have an impedance. That is, the resistance component R and the inductor component L may exist only in the IM. Therefore, when the non-magnetic HO to be heated is disposed on the upper plate 15 and the WC is driven, as illustrated in FIG. 4, the resistance component R and the inductor component L of the IM may form an equivalent circuit. Thus, eddy current I may be applied only to the IM, and eddy current may not be applied to the HO, which does not have magnetism. More specifically, the eddy current I generated by the WC may be applied only to the IM, and thus, the IM may be heated. That is, when the HO is the non-magnetic body, as described above, the eddy current I may be applied to the IM to heat the IM, and the HO, which does not have magnetism, may be indirectly heated by the IM heated by the WC. In this case, the IM may be a main heating source.

In summary, the HO may be directly or indirectly heated by a single heat source, which is called the WC, regardless of whether the HO is the magnetic body or the non-magnetic body. That is, when the HO is the magnetic body, the WC may directly heat the HO, and when the HO is the non-magnetic body, the IM heated by the WC may indirectly heat the HO.

Meanwhile, when the HO is a magnetic material, the heating efficiency is highest when all of the magnetic field generated from the WC is combined with the HO, but as a portion of the magnetic field is combined with the IM, there is a problem in that the heating efficiency is somewhat lowered. Therefore, when the HO is a magnetic material, the coupling force between the magnetic field generated from the WC and the IM is adjusted weakly, and when the HO is a non-magnetic material, there is a need for a method that can strongly control the coupling force between the magnetic field generated from the WC and the IM.

To this end, the eddy current characteristics induced in the IM were analyzed, and the results are described with reference to FIG. 5.

Figure 5:
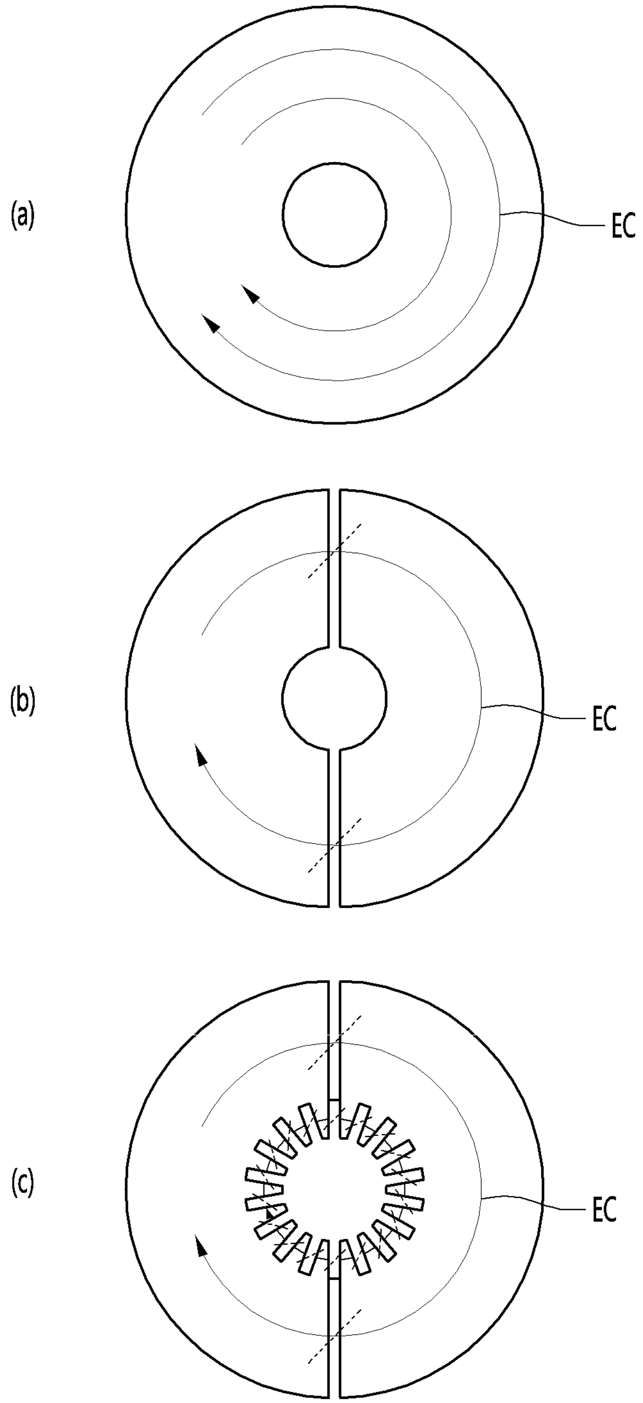
FIG. 5 is a view illustrating eddy current characteristics induced in an intermediate heating body according to an embodiment of the present disclosure.

FIG. 5 is a view illustrating eddy current characteristics induced in an IM according to an embodiment of the present disclosure.

As illustrated in (a) of FIG. 5, when the IM has a ring shape, the eddy current (EC) also flows along the ring shape, thereby forming a circular closed loop.

Meanwhile, as illustrated in (b) of FIG. 5, the IM may be formed by spacing apart two heating members that are half-moon shaped and concave on the inside. In this case, since the EC flows in each heating member, the path of the EC can be broken in the disconnection region, that is, the region indicated by the dotted line illustrated in (b) of FIG. 5, and, according to this, the area of the closed loop formed by the EC may be narrower than the area of the closed loop formed in (a) of FIG. 5.

In addition, as illustrated in driving of FIG. 5, the IM may be formed by spacing apart two heating members that are half-moon shaped, concave on the inside, and at the same time, are formed with a plurality of slits. In this case, the path of the EC may be broken in the disconnection region and the slit region, that is, the region indicated by the dotted line illustrated in (c) of FIG. 5, and according to this, the area of the closed loop formed by the EC may be narrower than the area of the closed loop formed in (b) of FIG. 5.

In summary, the area of the closed loop formed by the EC can be reduced as the number of disconnected areas in the IM increases. In addition, as the area of the closed loop decreases, the coupling force with the magnetic field becomes weaker, and the present disclosure intends to adjust the magnetic field coupling force of the intermediate heating object according to the type of the HO using this characteristic.

In the cooking appliance 1 according to various embodiments of the present disclosure, a separate switching structure is applied to the IM to adjust the magnetic field coupling force of the intermediate heating body. The cooking appliance 1 is disposed on the upper plate 15 and may include an IM through which eddy current flows when a magnetic field passes therethrough, and a switch connecting one point to another point on the IM. In addition, a disconnection portion of which at least a portion is cut is formed in the IM, and the switch may selectively connect the disconnection portion formed on the IM.

Figure 6:
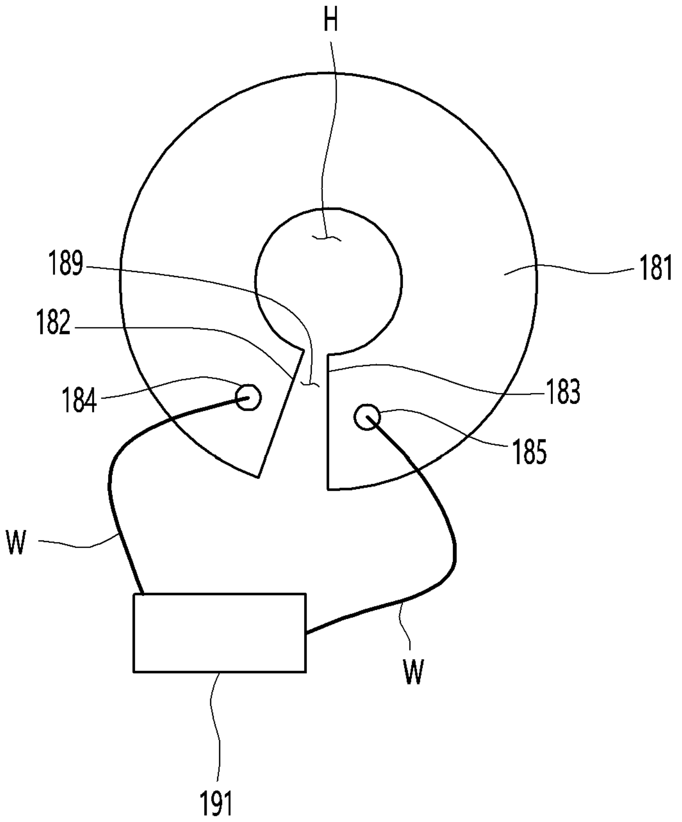
FIG. 6 is a view illustrating an intermediate heating body and a switch according to a first embodiment of the present disclosure.

FIG. 6 is a view illustrating an IM and a switch according to a first embodiment of the present disclosure.

According to the first embodiment of the present disclosure, the IM may include a disconnection portion 189 of which at least a portion is cut, may include one heating member 181 having a closed loop shape, and the switch may include one switch 191 connecting the disconnection portion 189.

In the example of FIG. 6, the heating member 181 may have a ring shape in which a hole (H) is formed in the center, but may have a disconnection portion 189 of which at least a portion is cut. Meanwhile, in FIG. 6, the heating member 181 is illustrated in a ring shape with a portion cut off, but this is only an example for convenience of description, and the heating member 181 may include a disconnection portion 189 with at least a portion cut off, and may include all shapes having a closed loop. The disconnection portion 189 may be a space formed by cutting a portion of the heating member 181. As at least a portion of the heating member 181 is disconnected, both ends 182 and 183 facing the disconnection portion 189 may be formed. In other words, a first end 182 and a second end 183 may be formed in the heating member 181 with the disconnection portion 189 interposed therebetween.

The switch 191 may connect the disconnection portion 189. For example, the switch 191 may connect one point 184 around the first end 182 and another point 185 around the second end 183. Hereinafter, that the switch connects the disconnection portion may mean connecting one point and another point around both ends of the heating member toward the disconnection portion.

When a magnetic field passes through the heating member 181 while the switch 191 is turned on, eddy current may flow from one point 184 to another point 185 through the switch 191 and the electric wire w connected thereto. Accordingly, when the switch 191 is turned on, the closed loop may be formed in a circular shape passing through the disconnection portion 189.

Meanwhile, when a magnetic field passes through the heating member 181 while the switch 191 is turned off, the closed loop formed by the eddy current may be broken at the disconnection portion 189. Accordingly, the closed loop when the switch 191 is turned off may have a smaller area than the closed loop when the switch 191 is turned on.

Figure 7:
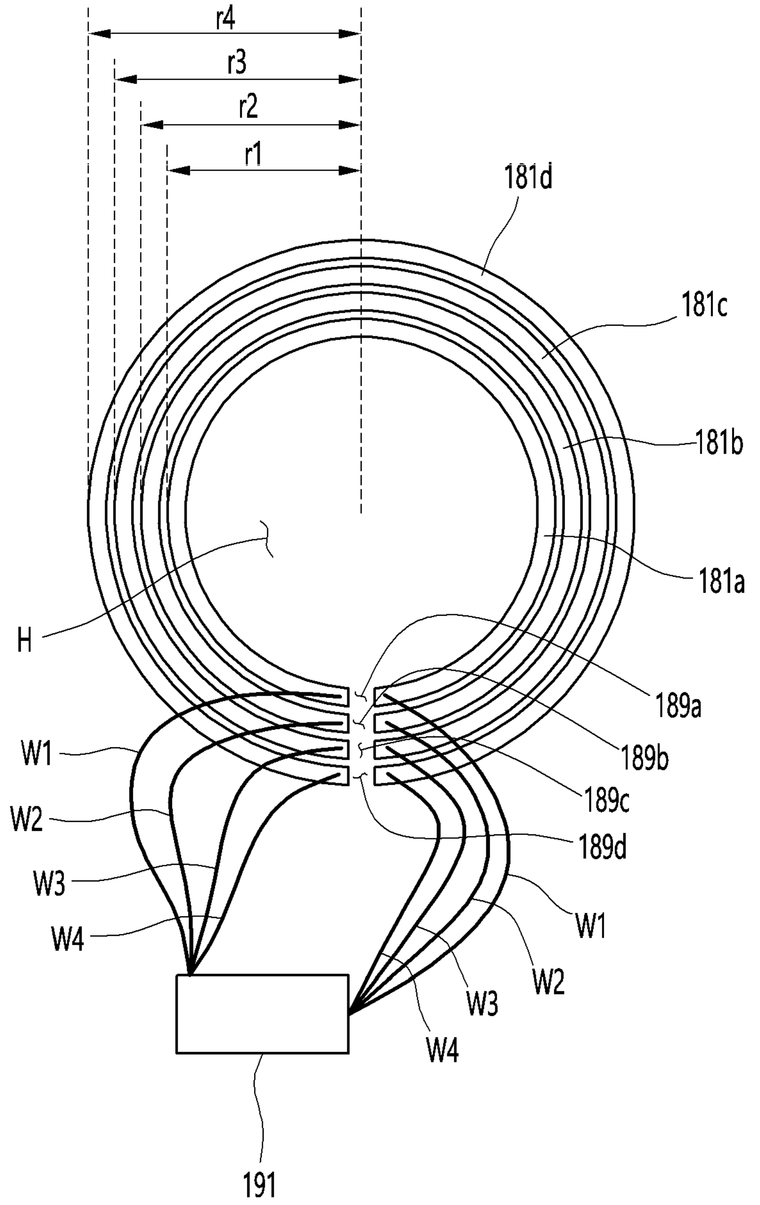
FIG. 7 is a view illustrating an intermediate heating body and a switch according to a second embodiment of the present disclosure.

FIG. 7 is a view illustrating an IM and a switch according to a second embodiment of the present disclosure.

According to the second embodiment of the present disclosure, the IM includes a disconnection portion of which at least a portion is cut and includes a plurality of heating members having a closed loop shape, and the switch may include one switch 191 that simultaneously connects or disconnects a plurality of disconnection portions formed on each of the plurality of heating members.

Figure 8:
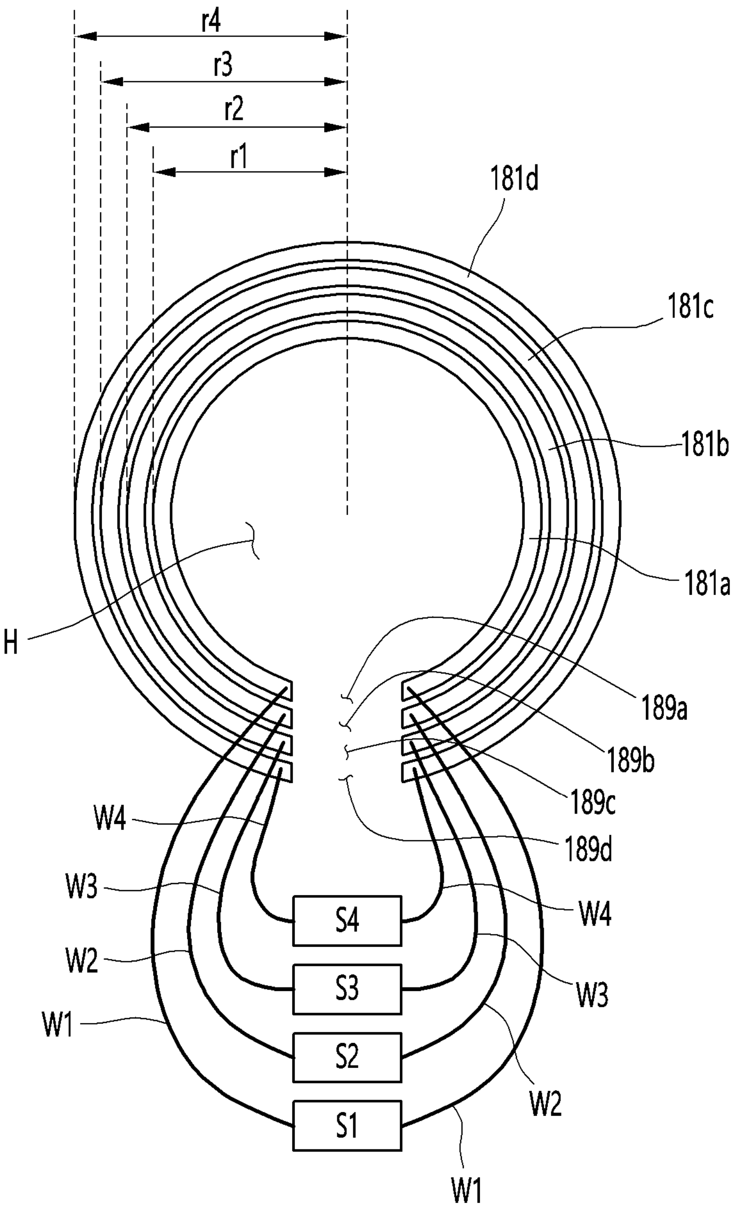
FIG. 8 is a view illustrating an intermediate heating body and a switch according to a third embodiment of the present disclosure.

Specifically, the IM may include at least first and second heating members 181*a* and 181*b* as a plurality of heating members. In FIGS. 7 and 8, the IM is described assuming that it includes four heating members, but this is an example for convenience of description, and the IM according to the present disclosure may include two or more heating members.

In the example of FIG. 7, the IM includes first to fourth heating members 181*a*, 181*b*, 181*c*, and 181*d*, and the first to fourth heating members 181*a*, 181*b*, 181*c*, and 181*d* may have a ring shape having disconnection portions 189*a*, 189*b*, 189*c*, and 189*d* of which at least a portion is cut, respectively. Meanwhile, in FIG. 7, the heating members 181*a*, 181*b*, 181*c*, and 181*d* are illustrated in a ring shape with a portion cut, but this is merely an example for convenience of explanation, and the heating members 181*a* through 181*d* includes a disconnection portion 189 of which at least a portion is cut, and may include all shapes having a closed loop. The first to fourth heating members 181*a*, 181*b*, 181*c*, and 181*d* may have different sizes, respectively.

The first heating member 181*a* may have a radius of a first length (r1) and a hole (H) may be formed in the center thereof.

The second heating member 181*b* may have a second length (r2) in radius, and a hole having a radius longer than the first length (r1) may be formed in the center. The first length (r1) may be shorter than the second length (r2). Accordingly, the first heating member 181*a* may be disposed inside the second heating member 181*b*.

The third heating member 181*c* may have a third length (r3) in radius, and a hole having a radius longer than the second length (r2) may be formed in the center. The second length (r2) may be shorter than the third length (r3). Accordingly, the second heating member 181*b* may be disposed inside the third heating member 181*c*.

The fourth heating member 181*d* may have a fourth length (r4) in radius, and a hole having a radius longer than the third length (r3) may be formed in the center. The third length (r3) may be shorter than the fourth length (r4). Accordingly, the third heating member 181*c* may be disposed inside the fourth heating member 181*d*.

Meanwhile, at least a portion of the first heating member 181*a* is cut to form a first disconnection portion 189*a*, and at least a portion of the second heating member 181*b* is cut to form a second disconnection portion 189*b*, at least a portion of the third heating member 181*c* may be cut to form a third disconnection portion 189*c*, and at least a portion of the fourth heating member 181*d* may be cut to form a fourth disconnection portion 189*d*.

The switch 191 may connect each of the first to fourth disconnection portions 189*a*, 189*b*, 189*c*, and 189*d* in parallel.

The switch 191 may simultaneously connect or disconnect each of the first to fourth disconnecting portions 189*a*, 189*b*, 189*c*, and 189*d*. As described in FIG. 6, each of the first to fourth heating members 181*a*, 181*b*, 181*c*, and 181*d* may have both ends of the disconnection portions 189*a*, 189*b*, 189*c*, and 189*d* interposed therebetween. Accordingly, when the switch 191 is turned on, a closed loop in which current passes through the switch 191 and the electric wires w1, w2, w3, and w4 connected thereto to pass through the first to fourth disconnection portions 189*a*, 189*b*, and 189*c*, 189*d*, respectively may be formed.

In other words, when the magnetic field passes through the first heating member 181*a* while the switch 191 is turned on, the eddy current can flow through the switch 191 and the first electric wire w1 connected thereto, and thus a closed loop may be formed in a circular shape passing through the first disconnection portion 189*a*. Similarly, when a magnetic field passes through the second heating member 181*b* while the switch 191 is turned on, the eddy current can flow through the switch 191 and the second electric wire w2 connected thereto, and thus a closed loop may be formed in a circular shape passing through the second disconnection portion 189*b*, and when a magnetic field passes through the third heating member 181*c* while the switch 191 is turned on, the eddy current may flow through the switch 191 and the third electric wire w3 connected thereto, and thus a closed loop is formed in a circular shape passing through the third disconnection portion 189*c*, and when a magnetic field passes through the fourth heating member 181*d* while the switch 191 is turned on, the eddy current flows through the switch 191 and the fourth electric wire w4 connected thereto, and thus a closed loop may be formed in a circular shape passing through the fourth disconnection portion 189*d*.

Meanwhile, when a magnetic field passes through each of the first to fourth heating members 181*a*, 181*b*, 181*c*, and 181*d* while the switch 191 is turned off, the closed loops formed by the eddy currents form the heating members, respectively. It may be broken at the first to fourth disconnection portions 189*a*, 189*b*, 189*c*, and 189*d*. Accordingly, when the switch 191 is turned off, the closed loop may have a smaller area than the closed loop when the switch 191 is turned on.

In addition, in the case of the second embodiment, one switch 191 simultaneously controls whether the first to fourth disconnection portions 189*a*, 189*b*, 189*c*, and 189*d* are connected, so there is an advantage in that the control logic can be simplified.

FIG. 8 is a view illustrating an IM and a switching portion according to a third embodiment of the present disclosure.

According to the second embodiment of the present disclosure, the IM may include a disconnection portion of which at least a portion is cut, include a plurality of heating members having a closed loop shape, and the switch may include a plurality of switches S1, S2, S3, and S4 connected to each of a plurality of disconnection portions formed on each of the plurality of heating members.

In the example of FIG. 8, the IM includes a plurality of heating members 181*a*, 181*b*, 181*c*, and 181*d*, and the plurality of heating members 181*a*, 181*b*, 181*c*, and 181*d* may have a ring shape having disconnection portions 189*a*, 189*b*, 189*c*, and 189*d* of which at least a portion is cut. Meanwhile, in FIG. 8, the heating members 181*a*, 181*b*, 181*c*, and 181*d* are illustrated in a ring shape with a portion cut, but this is merely an example for convenience of explanation, and the heating members 181*a*, 181*b*, 181*c*, and 181*d* includes a disconnection portion 189 of which at least a portion is cut and may include all shapes having a closed loop. The plurality of heating members 181*a*, 181*b*, 181*c*, and 181*d* may have different sizes. In other words, the plurality of heating members 181*a*, 181*b*, 181*c*, and 181*d* may be the same as those described in FIG. 7.

In other words, the first heating member 181*a* may have a first length (r1) in radius and a hole (H) may be formed in the center.

The second heating member 181*b* may have a second length (r2) in radius, and a hole having a radius longer than the first length (r1) may be formed in the center. The first length (r1) may be shorter than the second length (r2). Accordingly, the first heating member 181*a* may be disposed inside the second heating member 181*b*.

The third heating member 181*c* may have a third length (r3) in radius, and a hole having a radius longer than the second length (r2) may be formed in the center. The second length (r2) may be shorter than the third length (r3). Accordingly, the second heating member 181$b$ may be disposed inside the third heating member 181$c$.

The fourth heating member 181$d$ may have a fourth length (r4) in radius, and a hole having a radius longer than the third length (r3) may be formed in the center. The third length (r3) may be shorter than the fourth length (r4). Accordingly, the third heating member 181$c$ may be disposed inside the fourth heating member 181$d$.

In addition, as described with reference to FIG. 7, at least a portion of the first heating member 181$a$ is cut to form a first disconnection portion 189$a$, and at least a portion of the second heating member 181$b$ is cut to form a second disconnection portion 189$b$, at least a portion of the third heating member 181$c$ is cut to form a third disconnection portion 189$c$, and at least a portion of the fourth heating member 181$d$ is cut to form a fourth disconnection portion 189$d$.

However, in the case of the third embodiment, the switch 191 may include a plurality of switches S1, S2, S3, and S4 connecting the first to fourth disconnection portions 189$a$, 189$b$, 189$c$, and 189$d$, respectively.

Each of the plurality of switches S1, S2, S3, and S4 may determine whether the first to fourth disconnecting portions 189$a$, 189$b$, 189$c$, and 189$d$ are connected.

When the magnetic field passes through the first heating member 181$a$ while the first switch (S1) is turned on, a closed loop passing through the switch 191 and the first electric wire w1 connected thereto and passing through the first disconnection portion 189$a$ is formed, and when the magnetic field passes through the first heating member 181$a$ while the first switch (S1) is turned off, a closed loop cut by the first disconnection portion 189$a$ may be formed. In other words, when the first switch S1 is turned off, the closed loop may have a smaller area than the closed loop when the switch S1 is turned on.

When the magnetic field passes through the second heating member 181$b$ while the second switch S2 is turned on, a closed loop passing through the switch 191 and the second electric wire w2 connected thereto and passing through the first disconnection portion 189$b$ is formed, and when a magnetic field passes through the second heating member 181$b$ while the second switch S2 is turned off, a closed loop cut by the second disconnection portion 189$b$ may be formed. In other words, when the second switch S2 is turned off, the closed loop may have a narrower area than the closed loop when the switch S2 is turned on.

When a magnetic field passes through the third heating member 181$c$ while the third switch S3 is turned on, a closed loop passing through the switch 191 and the third electric wire w3 connected thereto and passing through the third disconnection portion 189$c$ is formed, and when a magnetic field passes through the third heating member 181$c$ while the third switch S3 is turned off, a closed loop cut by the third disconnection portion 189$c$ may be formed. In other words, when the third switch S3 is turned off, the closed loop may have a narrower area than the closed loop when the switch S3 is turned on.

When a magnetic field passes through the fourth heating member 181$d$ while the fourth switch S4 is turned on, a closed loop passing through the switch 191 and the fourth electric wire w4 connected thereto and passing through the fourth disconnection portion 189$d$ is formed, and when a magnetic field passes through the fourth heating member 181$d$ while the fourth switch S4 is turned off, a closed loop cut by the fourth disconnection portion 189$d$ may be formed. In other words, when the fourth switch S4 is turned off, the closed loop may have a narrower area than the closed loop when the switch S4 is turned on.

In the case of the third embodiment, there is an advantage in that the area of the closed loop formed in the first to fourth heating members 181$a$, 181$b$, 181$c$, and 181$d$ may be individually controlled through the switches S1, S2, S3, and S4. In addition, when individual control is possible in this way, there is an advantage in that it is possible to control the magnetic field coupling force between the magnetic field and the IM according to the size of the HO. This will be described in detail with reference to FIG. 11.

The switch of the cooking appliance 1 according to various embodiments of the present disclosure described above may operate based on the HO. Next, a method for operating the cooking appliance 1 according to various embodiments of the present disclosure will be described with reference to FIGS. 9 to 11.

Figure 9:
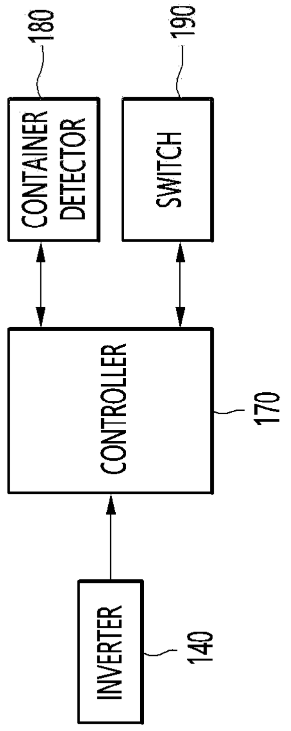
FIG. 9 is a control block diagram of a cooking appliance according to various embodiments of the present disclosure.

FIG. 9 is a control block diagram of a cooking appliance according to various embodiments of the present disclosure.

According to various embodiments of the present disclosure, the cooking appliance 1 may include at least some or all of the inverter portion 140, the controller 170, the container detector 180 and the switch 190. FIG. 9 illustrates some components for explaining the present disclosure, and the cooking appliance 1 may further include components other than those illustrated in FIG. 9.

The inverter 140 may be driven so that current is supplied to the WC.

The controller 170 may control the operation of the cooking appliance 1. The controller 170 may control each of the inverter 140, the container detector 180 and the switch 190.

The container detector 180 may detect the HO. The container detector 180 may detect the type or size of the HO. The container detector 180 may include at least one sensor (not illustrated) for detecting the type or size of the container.

According to an embodiment, the container detector 180 may detect the type or size of the HO by receiving a user input for selecting at least one of the type or size of the HO. In this case, the container detector 180 may include an input interface (not illustrated) for receiving a user input.

According to another embodiment, the container detection portion 180 may detect the type or size of the HO according to a pre-stored container detection algorithm. For example, the container detection portion 180 can detect types or sizes of the HO based on at least one piece of data, such as the size of an output of a current flowing through the WC for a predetermined time after starting the heating mode.

In other words, there are various methods for detecting the HO by the container detector 180, and the present disclosure is not limited thereto.

The switch 190 may include the switch 191 described in FIGS. 6 and 7 or the first to fourth switches S1, S2, S3, and S4 described in FIG. 8. The switch 190 may operate based on the type or size of the HO. In other words, the switch 190 may be turned on or off based on the type or size of the HO. In addition, the area of the closed loop formed by the eddy current may be changed according to the on or off of the switch 190.

First, with reference to FIG. 10, an operation method in the case where the IM and the switch are designed as described in FIG. 6 or 7 will be described.

Figure 10:
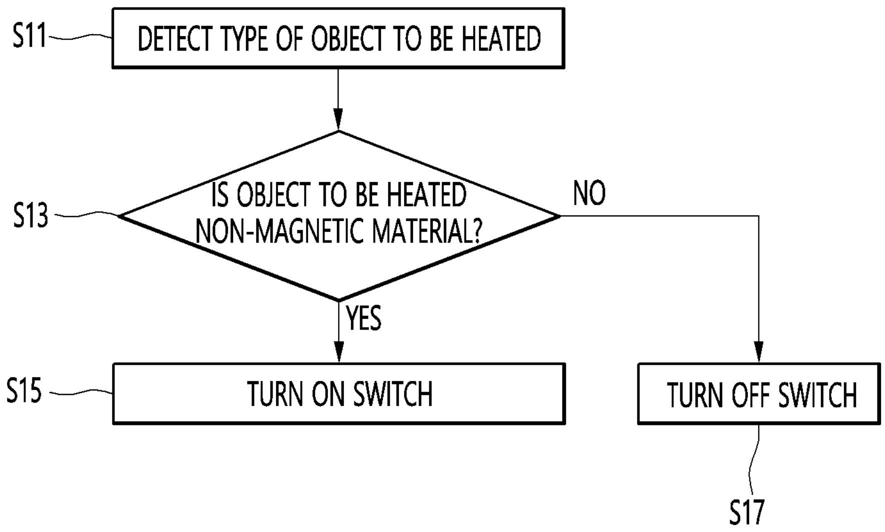
FIG. 10 is a flowchart illustrating a method for operating a cooking appliance having an intermediate heating body and a switch according to the first and second embodiments of the present disclosure.

FIG. 10 is a flowchart illustrating a method for operating a cooking appliance having an IM and a switching portion according to the first and second embodiments of the present disclosure.

The controller 170 may detect the type of HO (S11).

In other words, the controller 170 may detect whether the HO is a magnetic material or a non-magnetic material.

The controller 170 may determine whether the HO is a non-magnetic material (S13).

The controller 170 may control the switch 190 to be turned on when the HO is a non-magnetic material (S15) and may control the switch 190 to be turned off when the HO is a magnetic material (S17).

In other words, the switch 190 may be turned on when the HO is a non-magnetic material and turned off when the HO is a magnetic material. As described in FIGS. 6 and 7, if a closed loop having an area of the first size is formed in the IM when the switch 190 is turned on, when the switch 190 is turned off, a closed loop having an area of the second size smaller than an area of the first size may be formed in the IM. In other words, since the switch 190 operates such that the closed loop when the HO is a non-magnetic material is larger than the closed loop when the HO is a magnetic material, the magnetic field coupling force of the IM when the HO is a non-magnetic material may be stronger than the magnetic field coupling force of the IM when the HO is a magnetic material. Therefore, since the magnetic field generated from the working coil WC is more coupled with the IM when the HO is a non-magnetic material than when the HO is a magnetic material, there is an advantage of improving heating efficiency.

Next, with reference to FIG. 11, an operation method in the case where the IM and the switch are designed as described in FIG. 8 will be described.

Figure 11:
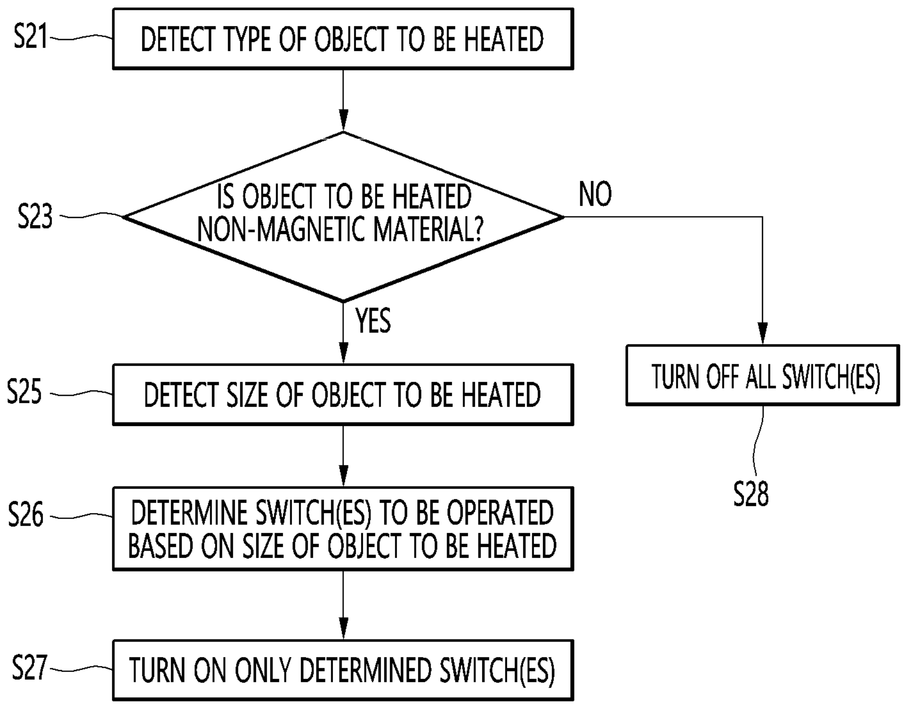
FIG. 11 is a flowchart illustrating a method for operating a cooking appliance having an intermediate heating body and a switch according to a third embodiment of the present disclosure.

FIG. 11 is a flowchart illustrating a method for operating a cooking appliance having an IM and a switch according to a third embodiment of the present disclosure.

The controller 170 may detect the type of HO (S21).

In other words, the controller 170 may detect whether the HO is a magnetic material or a non-magnetic material.

The controller 170 may determine whether the HO is a non-magnetic material (S23).

If the HO is a non-magnetic material, the controller 170 may detect the size of the HO (S25), determine a switch to be operated based on the size of the HO (S26), and control only the determined switch to be turned on (S27).

For example, if the HO is a non-magnetic material having a first size, only the first switch S1 may be determined as a switch to be operated, and only the first switch S1 may be controlled to be turned on. In this case, since a closed loop passing through the first disconnection portion 189*a* is formed only in the first heating member 181*a* and a closed loop having a narrow area by disconnecting by the second to the fourth disconnection portion 189*b*, 189*c*, and 189*d* is formed in the second to the third heating member 181*b*, 181*c*, and 181*d*, the magnetic field coupling force of the first heating member 181*a* may be the strongest. Accordingly, the upper plate region overlapping the first heating member 181*a* in the vertical direction may be intensively heated.

If the HO is a non-magnetic material having a second size larger than the first size, the first and second switches S1 and S2 are determined as switches to operate, and only the first and second switches S1 and S2 can be controlled to be turned on. In this case, since a closed loop passing through the first and second disconnection portions 189*a* and 189*b* is formed only in the first and second heating members 181*a* and 181*b*, and a closed loop having a small area is formed in the third to fourth heating members 181*c* and 181*d* by disconnecting by the third to fourth disconnection portions 189*c* and 189*d* is formed, the magnetic field coupling force of the first and second heating members 181*a* and 181*b* can be strengthened. Accordingly, the upper plate region overlapping the first and second heating members 181*a* and 181*b* in the vertical direction may be intensively heated.

If the HO is a non-magnetic material having a third size larger than the second size, the first to third switches S1, S2, and S3 are determined as switches to operate, and only the first to third switches S1, S2, and S3 can be controlled to be turned on. In this case, since a closed loop passing through the first to third disconnection portions 189*a*, 189*b*, and 189*c* is formed only in the first to third heating members 181*a*, 181*b*, and 181*c*, and a closed loop having a small area is formed in the fourth heating members 181*d* by disconnecting by the fourth disconnection portions 189*d* is formed, the magnetic field coupling force of the first to third heating members 181*a*, 181*b*, and 181*c* can be strengthened. Accordingly, the upper plate region overlapping the first to third heating members 181*a*, 181*b*, and 181*c* in the vertical direction may be intensively heated.

If the HO is a non-magnetic material larger than the third size, the first to fourth switches S1, S2, S3, and S4 are determined as switches to operate, and only the first to fourth switches S1, S2, S3, and S4 can be controlled to be turned on. In this case, since a closed loop passing through the first to fourth disconnection portions 189*a*, 189*b*, 189*c*, and 189*d* is formed all in the first to fourth heating members 181*a*, 181*b*, 181*c*, and 181*d*, the magnetic field coupling force of the first to fourth heating members 181*a*, 181*b*, 181*c*, and 181*d* can be strengthened. Accordingly, the upper plate region overlapping the first to fourth heating members 181*a*, 181*b*, 181*c*, and 181*d* in the vertical direction may be intensively heated.

In other words, the controller 170 can adjust the area to be intensively heated in the upper plate according to the size of the HO, there is an advantage of improving the heating efficiency according to the size of the HO.

Meanwhile, if the HO is a magnetic material, the controller 170 may control all switches to be turned off (S28).

Since if the HO is a magnetic material, all the switches S1, S2, S3, and S4 are turned off, the area of the closed loop formed in the IM may be narrower than the area of the closed loop formed in the IM when at least one of the plurality of switches S1, S2, S3, and S4 is turned on. Therefore, when the HO is a magnetic material, the magnetic field coupling force of the IM may be weaker than the magnetic field coupling force of the IM when at least one of the plurality of switches S1, S2, S3, and S4 is turned on. In other words, since the magnetic field coupling force of the IM is the weakest when the HO is a magnetic body, the magnetic field generated from the working coil WC has a relatively strong coupling force with the HO, and the heating efficiency can be improved.

In summary, when the IM and the switch are designed as described in FIG. 8, it is determined whether the plurality of switches S1, S2, S3, and S4 are turned off together based on the type of the HO, and a switch to be operated among the plurality of switches S1, S2, S3, and S4 may be determined based on the size of the HO.

In other words, when the HO is a magnetic material, it may be determined that a plurality of switches is turned off together. In addition, if the HO is a non-magnetic material, a switch to be turned on among a plurality of switches may be determined, and at this time, a switch to be turned on among the plurality of switches may be determined based on the size of the HO.

For example, assuming that the switch includes a first switch connecting the first disconnection portion formed on the first heating member and a second switch connecting the second disconnection portion formed on the second heating member, the first switch and the second switch may be turned off together based on the type of the HO, and turned on respectively according to the size of the HO. More specifically, assuming that the second heating member is larger than the first heating member, when the HO is a magnetic material, the first switch and the second switch are turned off together, and when the HO is a non-magnetic material having a predetermined size or more, the first switch and the second switch may be turned on together, and when the HO is a non-magnetic material smaller than a predetermined size, only the first switch may be turned on.

Meanwhile, although it has been described in FIG. 11 that the switch to be operated is determined according to the size of the HO, the controller 170 may determine the switch to be operated according to the size of the heating area according to an embodiment.

For example, the controller 170 may receive an input for selecting the size of the heating region through an input interface (not illustrated) and may determine a switch to be operated according to the size of the heating region.

Meanwhile, in the above-described embodiments, the switch may be disposed apart from the IM by a predetermined distance or more. Specifically, since the IM may generate heat at about 500 degrees or more, the IM and the switch may be spaced apart from each other by a predetermined distance or more to prevent breakage of the switch. Alternatively, at least one heat insulation member may be provided between the IM and the switch.

In addition, the switch has an advantage that a plurality of switching elements can be configured in parallel, and accordingly, the allowable current of the switching element is increased.

In addition, in the above-described embodiments, there is an advantage in that the electric wires w, w1, w2, w3, and w4 may have a form composed of several strands, and in this case, there is an advantage in that heat generation of the electric wires themselves is suppressed.

The above description is merely an example of the technical idea of the present disclosure, and various modifications and variations may be made to those skilled in the art without departing from the essential characteristics of the present disclosure.

Therefore, the embodiments disclosed in this disclosure are not intended to limit the technical spirit of the present disclosure, but to explain, and the scope of the technical spirit of the present disclosure is not limited by these embodiments.

The protection scope of the present disclosure should be construed by the claims below, and all technical ideas within the scope equivalent thereto should be construed as being included in the scope of the present disclosure.

What is claimed is:

1. A cooking appliance comprising:

an upper plate configured to support an object to be heated;

a working coil configured to generate a magnetic field to heat the object to be heated;

an inverter configured to apply current to the working coil;

an intermediate heating body located at the upper plate, the intermediate heating body configured to generate an eddy current when the magnetic field passes through the intermediate heating body; and a switch configured to connect a first point and a second point on the intermediate heating body.

2. The cooking appliance of claim 1, wherein the intermediate heating body includes a pair of spaced ends, the pair of spaced ends defining a disconnection portion, and wherein the switch selectively connects the disconnection portion.

3. The cooking appliance of claim 2, wherein the intermediate heating body is a single heating member, and wherein the switch is a single switch connecting the disconnection portion.

4. The cooking appliance of claim 1, wherein the intermediate heating body includes a plurality of heating members, each heating member having a pair of spaced ends to define a corresponding disconnection portion, and wherein the switch is a single switch configured to simultaneously connect or disconnect a plurality of the disconnection portions.

5. The cooking appliance of claim 1, wherein the intermediate heating body includes a plurality of heating members, each heating member having a pair of spaced ends to define a corresponding disconnection portion, and wherein the switch includes a plurality of switches, each switch connected to a corresponding one of the plurality of disconnection portions.

6. The cooking appliance of claim 5, wherein a size of each of the plurality of heating members is different from each other.

7. The cooking appliance of claim 5, wherein the plurality of heating members includes a first heating member and a second heating member, and wherein a radius of the first heating member is shorter than a radius of the second heating member.

8. The cooking appliance of claim 7, further comprising a controller configured to:

detect a size and a type of the object to be heated; and for each switch, control whether the switch is on or off based on at least one of the detected type of the object to be heated or the size of the object to be heated.

9. The cooking appliance of claim 8, wherein the plurality of switches includes:

a first switch connecting the disconnection portion of the first heating member, and a second switch connecting the disconnection portion of the second heating member.

10. The cooking appliance of claim 9, wherein, when the detected type of object to be heated is a magnetic material, the first switch and the second switch are turned off together, wherein, when the type of object to be heated is a non-magnetic material being a predetermined size or larger, the first switch and the second switch are turned on together, and wherein, when the type of object to be heated is a non-magnetic material being smaller than the predetermined size, only the first switch is turned on.

11. The cooking appliance of claim 5, wherein the plurality of heating members are concentrically arranged.

12. The cooking appliance of claim 1, further comprising a controller configured to:

detect a size and a type of the object to be heated; and control whether the switch is to be on or off based on at least one of the detected type of the object to be heated or the size of the object to be heated.

13. The cooking appliance of claim 1, wherein a geometrical size of the eddy current is limited according to whether the switch is on or off.

14. The cooking appliance of claim 13, wherein, when the switch is on, the geometrical size of the eddy current is greater than when the switch is off.

15. The cooking appliance of claim 14, further comprising a controller configured to:
- detect a type of the object to be heated;
- control the switch to be on when the type of object to be heated is a non-magnetic material; and
- control the switch to be off when the type of object to be heated is a magnetic material.

16. A cooking appliance comprising:
- an upper plate configured to support an object to be heated;
- a working coil configured to generate a magnetic field to heat the object to be heated;
- an inverter configured to apply current to the working coil;
- an intermediate heating body located at the upper plate, the intermediate heating body configured to generate an eddy current when the magnetic field passes through the intermediate heating body, the intermediate heating body including a plurality of heating members, each heating member having a pair of spaced ends defining a corresponding disconnection portion,
- at least one switch configured to connect a first point and a second point on the intermediate heating body; and
- a controller configured to:
  - detect a size and a type of the object to be heated; and
  - control whether the at least one switch is to be on or off based on at least one of the detected type of the object to be heated or the size of the object to be heated.

17. The cooking appliance of claim 16, wherein the at least one switch is a single switch configured to simultaneously connect or disconnect a plurality of the disconnection portions.

18. The cooking appliance of claim 16, wherein the at least one switch includes a plurality of switches, each switch being connected to a corresponding one of the plurality of disconnection portions.

19. The cooking appliance of claim 16, wherein a size of each of the plurality of heating members is different from each other.

20. The cooking appliance of claim 16, wherein the plurality of heating members are concentrically arranged.

* * * * *